US012284201B2

(12) United States Patent
Sand et al.

(10) Patent No.: US 12,284,201 B2
(45) Date of Patent: Apr. 22, 2025

(54) SYSTEMS AND METHODS FOR PROACTIVELY MONITORING THE INHERENT CYBER-TECH RISK OF SOFTWARE AND HARDWARE COMPONENTS

(71) Applicant: JPMORGAN CHASE BANK, N.A., New York, NY (US)

(72) Inventors: Ankur Sand, Cambridge (GB); Ken Wilson, Millington, NJ (US); Marty Grant, Middletown, DE (US); Herman Wijaya, New York, NY (US); David R. Edwards, Yokosuka (JP)

(73) Assignee: JPMORGAN CHASE BANK, N.A., New York, NY (US)

( * ) Notice: Subject to any disclaimer, the term of this patent is extended or adjusted under 35 U.S.C. 154(b) by 181 days.

(21) Appl. No.: 18/061,242

(22) Filed: Dec. 2, 2022

(65) Prior Publication Data

US 2024/0187439 A1   Jun. 6, 2024

(51) Int. Cl.
*H04L 9/40* (2022.01)
(52) U.S. Cl.
CPC ................ *H04L 63/1433* (2013.01)
(58) Field of Classification Search
CPC ................................... H04L 63/1433
See application file for complete search history.

(56) References Cited

U.S. PATENT DOCUMENTS

| | | | | |
|---|---|---|---|---|
| 7,966,612 B2* | 6/2011 | D'Alterio | ................ | G06F 8/61 719/331 |
| 8,255,280 B1* | 8/2012 | Kay | ........................ | G06F 21/57 705/26.1 |
| 8,819,655 B1* | 8/2014 | Hopwood | ............... | G06F 8/658 717/174 |
| 9,354,769 B1* | 5/2016 | Kudva | ................ | H04L 12/1822 |
| 10,037,203 B1* | 7/2018 | Chavez | ................... | G06F 8/656 |
| 10,423,522 B2* | 9/2019 | Bergen | ................ | G06F 11/3604 |
| 10,534,918 B1* | 1/2020 | Davidi | ................... | G06F 21/577 |
| 10,691,810 B1* | 6/2020 | Freitag | ...................... | G06F 8/71 |
| 10,992,670 B1* | 4/2021 | Drooger | ............. | H04L 63/0428 |
| 11,030,318 B1* | 6/2021 | Shavro | ................... | G06F 21/577 |

(Continued)

*Primary Examiner* — Aravind K Moorthy
(74) *Attorney, Agent, or Firm* — GREENBERG TRAURIG LLP

(57) ABSTRACT

Systems and methods for proactively monitoring the inherent cyber-tech risk of software and hardware components are disclosed. In one embodiment, a method for proactively monitoring a cyber risk of a computer program may include: (1) receiving, by a product/version risk assessment computer program executed by an electronic device and from a user computer program executed by a use electronic device, an identification of a plurality of proposed components to include in the computer program; (2) retrieving, by the product/version risk assessment computer program, vulnerability information for each of the plurality of proposed components, wherein the vulnerability information identifies a security vulnerability for the proposed component; (3) generating, by a product/version risk scoring computer program, a risk score for the computer program under development based on the vulnerability information; and (4) returning, by the vulnerability assessment computer program, the risk score to the user computer program.

17 Claims, 3 Drawing Sheets

(56) References Cited

U.S. PATENT DOCUMENTS

| | | | |
|---|---|---|---|
| 11,070,496 B1* | 7/2021 | Rae | G06F 8/71 |
| 11,074,062 B1* | 7/2021 | Hosic | G06F 8/65 |
| 11,106,801 B1* | 8/2021 | Levine | G06F 11/3692 |
| 11,145,093 B2* | 10/2021 | De Cremer | G06Q 50/2057 |
| 11,240,268 B1* | 2/2022 | Lieberman | G06F 21/554 |
| 11,252,172 B1* | 2/2022 | Valiensi | G06F 16/2379 |
| 11,283,824 B1* | 3/2022 | Berger | H04L 63/1416 |
| 11,327,722 B1* | 5/2022 | Bahrami | G06F 8/311 |
| 11,809,841 B1* | 11/2023 | Zhang | G06F 8/33 |
| 2004/0006704 A1* | 1/2004 | Dahlstrom | G06F 21/577 726/25 |
| 2005/0160480 A1* | 7/2005 | Birt | G06F 11/008 726/25 |
| 2007/0044153 A1* | 2/2007 | Schuba | G06F 21/55 713/188 |
| 2008/0209567 A1* | 8/2008 | Lockhart | G06F 21/577 726/25 |
| 2011/0173693 A1* | 7/2011 | Wysopal | G06F 21/577 726/19 |
| 2011/0208785 A1* | 8/2011 | Burke | G06F 8/00 707/E17.005 |
| 2012/0072968 A1* | 3/2012 | Wysopal | G06F 21/577 726/1 |
| 2012/0284684 A1* | 11/2012 | Michaely | G06F 8/40 717/103 |
| 2013/0007885 A1* | 1/2013 | Haviv | H04L 63/1433 726/25 |
| 2013/0325545 A1* | 12/2013 | Mordvinova | G06Q 10/06 705/7.28 |
| 2014/0189668 A1* | 7/2014 | Balasubramanian | G06F 8/36 717/163 |
| 2014/0279550 A1* | 9/2014 | Zhang | G06F 21/105 705/59 |
| 2015/0067838 A1* | 3/2015 | Gunti | G06F 21/51 726/22 |
| 2015/0089488 A1* | 3/2015 | Anderson | G06F 8/65 717/172 |
| 2015/0100940 A1* | 4/2015 | Mockus | G06F 8/70 717/101 |
| 2016/0378987 A1* | 12/2016 | Ferrara | H04L 63/20 726/1 |
| 2017/0024311 A1* | 1/2017 | Andrejko | G06F 11/3668 |
| 2017/0147338 A1* | 5/2017 | Jackson | G06F 11/36 |
| 2017/0185783 A1* | 6/2017 | Brucker | G06F 21/577 |
| 2017/0187741 A1* | 6/2017 | Desch | H04L 63/1408 |
| 2017/0200012 A1* | 7/2017 | Hay | G06F 21/31 |
| 2017/0206360 A1* | 7/2017 | Brucker | G06F 21/577 |
| 2017/0235661 A1* | 8/2017 | Liu | G06F 8/443 717/106 |
| 2017/0243009 A1* | 8/2017 | Sejpal | G06F 21/577 |
| 2017/0364686 A1* | 12/2017 | Stafford | G06F 8/65 |
| 2018/0088928 A1* | 3/2018 | Smith | H04L 67/34 |
| 2018/0137286 A1* | 5/2018 | Ionescu | G06F 11/3688 |
| 2018/0198814 A1* | 7/2018 | Brodie | G06F 21/57 |
| 2018/0336356 A1* | 11/2018 | Papaxenopoulos | G06F 8/65 |
| 2018/0349614 A1* | 12/2018 | Ionescu | G06F 21/577 |
| 2019/0028490 A1* | 1/2019 | Chen | H04L 63/1416 |
| 2019/0102286 A1* | 4/2019 | Duer | G06F 11/3688 |
| 2019/0205542 A1* | 7/2019 | Kao | G06F 8/10 |
| 2019/0230098 A1* | 7/2019 | Navarro | H04L 63/1433 |
| 2019/0238593 A1* | 8/2019 | Larmuseau | G06F 8/65 |
| 2019/0250893 A1* | 8/2019 | Pandit | G06N 20/00 |
| 2019/0324744 A1* | 10/2019 | Alam | G06F 8/31 |
| 2019/0391792 A1* | 12/2019 | Sabharwal | G06N 3/045 |
| 2020/0050770 A1* | 2/2020 | Inagaki | G06F 21/577 |
| 2020/0125342 A1* | 4/2020 | Dominiak | G06N 20/00 |
| 2020/0218993 A1* | 7/2020 | Kumar | G06F 8/36 |
| 2020/0249928 A1* | 8/2020 | Zeng | G06F 9/5038 |
| 2021/0021633 A1* | 1/2021 | Landman | H04L 63/1433 |
| 2021/0026654 A1* | 1/2021 | Soman | G06F 21/31 |
| 2021/0026947 A1* | 1/2021 | Korotaev | G06F 9/4856 |
| 2021/0026949 A1* | 1/2021 | Korotaev | G06F 21/554 |
| 2021/0126934 A1* | 4/2021 | Jenkins | H04L 63/1433 |
| 2021/0141717 A1* | 5/2021 | Ananthapur Bache | G06F 11/3688 |
| 2021/0141906 A1* | 5/2021 | Pickren | G06F 21/577 |
| 2021/0182182 A1* | 6/2021 | Felisatti | G06F 11/3688 |
| 2021/0200840 A1* | 7/2021 | Kannan | G06F 8/73 |
| 2021/0264031 A1* | 8/2021 | Dhillon | G06F 21/577 |
| 2021/0288991 A1* | 9/2021 | Shakarian | H04L 41/16 |
| 2021/0303447 A1* | 9/2021 | Haze | G06F 11/3664 |
| 2021/0374014 A1* | 12/2021 | Appireddygari Venkataramana | G06F 11/1451 |
| 2021/0406004 A1* | 12/2021 | Ray | G06F 8/77 |
| 2022/0012019 A1* | 1/2022 | Wilson-Thomas | H04L 63/12 |
| 2022/0038490 A1* | 2/2022 | Thakur | G06N 3/045 |
| 2022/0108020 A1* | 4/2022 | Dang | G06F 8/658 |
| 2022/0138327 A1* | 5/2022 | Panicker | G06F 21/577 726/25 |
| 2022/0171697 A1* | 6/2022 | Moukahal | G06N 5/048 |
| 2022/0179639 A1* | 6/2022 | Manley | G06F 8/65 |
| 2022/0222351 A1* | 7/2022 | Levin | G06F 21/577 |
| 2022/0269583 A1* | 8/2022 | Plawecki | G06F 11/3684 |
| 2022/0309163 A1* | 9/2022 | Purushothaman | G06F 21/31 |
| 2022/0318395 A1* | 10/2022 | Janakiraman | G06F 21/577 |
| 2022/0398075 A1* | 12/2022 | Vyas | G06F 11/3688 |
| 2022/0405397 A1* | 12/2022 | Golan | G06F 21/57 |
| 2023/0036739 A1* | 2/2023 | Deppisch | G06F 9/45558 |
| 2023/0088784 A1* | 3/2023 | Negussie | G06N 20/00 717/102 |
| 2023/0103049 A1* | 3/2023 | Chitalia | G06F 21/577 726/25 |
| 2023/0113733 A1* | 4/2023 | Suneja | G06F 8/4435 717/151 |
| 2023/0129631 A1* | 4/2023 | Khan | G06F 21/31 726/25 |
| 2023/0130781 A1* | 4/2023 | Suneja | G06F 8/75 706/12 |
| 2023/0136623 A1* | 5/2023 | Chivukula | G06F 8/73 726/25 |
| 2023/0177168 A1* | 6/2023 | Chernov | G06F 21/577 726/1 |
| 2023/0195901 A1* | 6/2023 | Allen | G06F 21/577 726/25 |
| 2023/0267208 A1* | 8/2023 | Sethi | G06F 21/568 726/25 |
| 2023/0281314 A1* | 9/2023 | Capellman | H04L 63/20 726/25 |
| 2023/0281316 A1* | 9/2023 | Lewandowski | G06F 21/577 726/22 |
| 2023/0291755 A1* | 9/2023 | Siebel | H04L 63/1416 |
| 2023/0342145 A1* | 10/2023 | Kandel | G06F 8/77 |
| 2023/0367883 A1* | 11/2023 | Bussell | G06F 21/577 |
| 2023/0385042 A1* | 11/2023 | Obando Chacon | G06F 8/447 |
| 2024/0004623 A1* | 1/2024 | Groenewegen | G06F 8/42 |
| 2024/0020390 A1* | 1/2024 | Wirges | G06F 9/45558 |
| 2024/0037157 A1* | 2/2024 | Shah | G06F 16/35 |
| 2024/0056456 A1* | 2/2024 | Bouchard | H04L 63/145 |
| 2024/0056467 A1* | 2/2024 | Bouchard | H04L 63/1433 |
| 2024/0095027 A1* | 3/2024 | Fanning | G06F 8/77 |
| 2024/0126526 A1* | 4/2024 | Malvankar | G06F 8/63 |
| 2024/0134634 A1* | 4/2024 | Beg | G06F 8/71 |
| 2024/0134997 A1* | 4/2024 | Madala | G06F 21/577 |
| 2024/0163303 A1* | 5/2024 | Kraus | H04L 63/1433 |

* cited by examiner

SYSTEMS AND METHODS FOR PROACTIVELY MONITORING THE INHERENT CYBER-TECH RISK OF SOFTWARE AND HARDWARE COMPONENTS

BACKGROUND OF THE INVENTION

1. Field of the Invention

Embodiments generally relate to systems and methods for proactively monitoring the inherent cyber-tech risk of software and hardware components.

2. Description of the Related Art

Large organizations use many computer products. There are no proactive ways to identify and/or monitor the inherent cyber-tech risks of existing products before they are used. Due to a lack of product-based risk ranking methodology, currently cyber-risk considerations often start late in the Software Development Life Cycle (SDLC) which brings resource overhead and often results in unwanted cyber-risk exposures.

SUMMARY OF THE INVENTION

Systems and methods for proactively monitoring the inherent cyber-tech risk of software and hardware components are disclosed. In one embodiment, a method for proactively monitoring a cyber risk of a computer program may include: (1) receiving, by a product/version risk assessment computer program executed by an electronic device and from a user computer program executed by a use electronic device, an identification of a plurality of proposed components to include in the computer program; (2) retrieving, by the product/version risk assessment computer program, vulnerability information for each of the plurality of proposed components, wherein the vulnerability information identifies a security vulnerability for the proposed component; (3) generating, by a product/version risk scoring computer program, a risk score for the computer program under development based on the vulnerability information; and (4) returning, by the vulnerability assessment computer program, the risk score to the user computer program.

In one embodiment, the proposed components may include hardware components and/or software components.

In one embodiment, the vulnerability information is retrieved from an external threat and vulnerability tool/database.

In one embodiment, the vulnerability information is further retrieved from an internal threat and vulnerability tool/database.

In one embodiment, the risk score is based on a stack score for the computer program under development, a vulnerability density for each of the plurality of components, threat intelligence inputs for each of the plurality of components, patching maturity for each of the plurality of components, a lifecycle state for each of the plurality of components, and support coverage for each of the plurality of components.

In one embodiment, the risk score comprises a dynamic qualitative severity rating.

In one embodiment, the method may also include identifying, by the product/version risk assessment computer program, an alternate component for a potential component in response to the potential component having certain cyber-tech risk related information. In one embodiment, the alternate component may be identified using a trained machine learning engine.

According to another embodiment, a system may include a user electronic device executing a user computer program; an electronic device executing a product/version risk assessment computer program and a product/version risk scoring computer program; an internal threat and vulnerability tool/database; and an external threat and vulnerability tool/database. The user computer program receives an identification of a plurality of proposed components to include in a computer program, the product/version risk assessment computer program receives the identification of a plurality of proposed components and retrieves vulnerability information for each of the plurality of proposed components from the internal threat and vulnerability tool/database and the external threat and vulnerability tool/database; the product/version risk scoring computer program generates a risk score for the computer program under development based on the vulnerability information; and the vulnerability assessment computer program returns the risk score to the user computer program.

In one embodiment, the proposed components may include hardware components and/or software components.

In one embodiment, the risk score may be based on a stack score for the computer program under development, a vulnerability density for each of the plurality of components, threat intelligence inputs for each of the plurality of components, patching maturity for each of the plurality of components, a lifecycle state for each of the plurality of components, and support coverage for each of the plurality of components.

In one embodiment, the risk score may include a dynamic qualitative severity rating.

In one embodiment, the product/version risk assessment computer program identifies an alternate component for a potential component in response to the potential component having certain cyber-tech risk related information.

In one embodiment, the system may also include a trained machine learning engine, and the product/version risk assessment computer program identifies the alternate component using the trained machine learning engine.

According to another embodiment, a non-transitory computer readable storage medium, may include instructions stored thereon, which when read and executed by one or more computer processors, cause the one or more computer processors to perform steps comprising: receiving, from a user computer program executed by a user electronic device, an identification of a plurality of proposed components to include in a computer program; retrieving vulnerability information for each of the plurality of proposed components, wherein the vulnerability information identifies a security vulnerability for the proposed component; generating a risk score for the computer program under development based on the vulnerability information; and returning the risk score to the user computer program.

In one embodiment, the proposed components may include hardware components and/or software components.

In one embodiment, the vulnerability information is retrieved from an external threat and vulnerability tool/database.

In one embodiment, the vulnerability information is further retrieved from an internal threat and vulnerability tool/database.

In one embodiment, the risk score may be based on a stack score for the computer program under development, a vulnerability density for each of the plurality of components, threat intelligence inputs for each of the plurality of components, patching maturity for each of the plurality of components, a lifecycle state for each of the plurality of components, and support coverage for each of the plurality of components.

In one embodiment, the risk score may include a dynamic qualitative severity rating.

In one embodiment, the non-transitory computer readable storage medium of claim 15, may also include instructions stored thereon, which when read and executed by one or more computer processors, cause the one or more computer processors to perform identify an alternate component for a potential component in response to the potential component having certain cyber-tech risk related information using a trained machine learning engine.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for proactively monitoring the inherent cyber-tech risk of software and hardware components.

Embodiments may provide a proactive, risk-driven approach to calculate a transparent related risk status for a computer program/components before and after it is developed.

Embodiments may include several components: risk scoring and visualization, recommendations, forecast/prediction, and subscription/alerting.

Embodiments may provide at least some of the following benefits: a better developer experience by pre-informing developers of vulnerabilities early in development and for current/future usages; dynamic cyber-tech risk representation via, for example, quantitative and qualitative methods, to support situational changes; increase time to market by identifying vulnerabilities early in development; reduction in costs due to less remediation; improved data driven transparency and insights by integral artificial intelligence and machine learning components; universal coverage (e.g., hardware, software, firmware, Internet of Things (IoT) appliances, etc.), dashboard based visualization schemes, etc.

Figure 1:
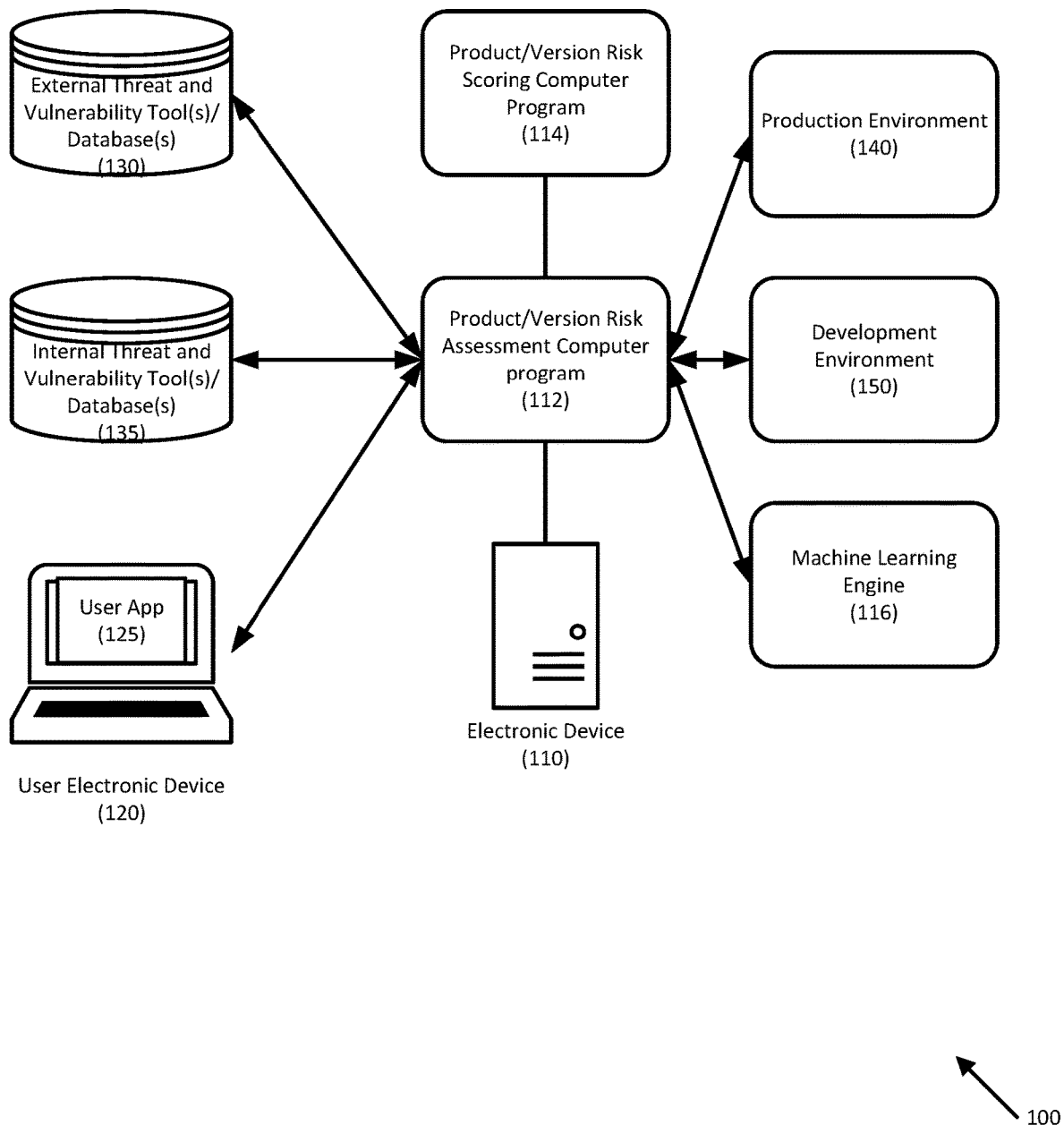
FIG. 1 depicts a system for proactively monitoring the inherent cyber-tech risk of software and hardware components according to an embodiment.

Referring to FIG. 1, a system for proactively monitoring the inherent cyber-tech risk of software and hardware components is disclosed according to an embodiment. System 100 may include electronic device 110, which may be any suitable electronic device, such as servers (e.g., cloud based and/or physical), computers (e.g., workstation, desktop, notebook, laptop, tablet, etc.), smart devices (e.g., smartphones, smartwatches, etc.) Internet of Things (IoT) appliances, etc. Electronic device 110 may execute one or more computer programs or applications, including, for example, product/version risk assessment computer program 112.

Product/version risk assessment computer program 112 may be a distributed computer application that may also be executed by user electronic device 120. In another embodiment, user electronic device 120 may access product/version risk assessment computer program 112 via a user interface (not shown), such as a browser.

Product/version risk assessment computer program 112 may interface with product threat and vulnerability tools/databases, including external threat and vulnerability tool(s)/database(s) 130 and internal threat and vulnerability tool(s)/database(s) 135. External threat and vulnerability tool(s)/database(s) 130 may identify vulnerabilities for hardware and software components, such as security-related software flaws, misconfigurations, impact metrics, etc. External threat and vulnerability tool(s)/database(s) 130 may be provided by third parties. Examples of external threat and vulnerability tool(s)/database(s) 130 include the National Vulnerability Database, Technopedia, vendor specific security release bulletins, etc.

Internal threat and vulnerability tool(s)/database(s) 135 may include vulnerability information, policies, and tools for the organization. In one embodiment, internal threat and vulnerability tool(s)/database(s) 135 may impose additional restrictions on any software components.

User electronic device 120 may be any suitable electronic device, including computers (e.g., workstation, desktop, notebook, laptop, tablet, etc.), smart devices (e.g., smartphones, smartwatches, etc.) Internet of Things (IoT) appliances, etc. Using user application 125, a user, such as a developer, may identify proposed software components to be used in a computer program being developed. The user may also identify potential hardware components that may execute the computer program. Product/version risk assessment computer program 112 may receive an identification of the software and/or hardware components, and may retrieve vulnerability information from threat and vulnerability tool(s)/database(s) 130 and/or internal threat and vulnerability tool(s)/database(s) 135, and may assess the computer program based on the vulnerabilities.

In one embodiment, product/version risk assessment computer program 112 may generate a risk score for the program using product/version risk scoring computer program 114. Product/version risk scoring computer program 114 may consider factors including, for example, a stack score (e.g., hardware, firmware/hypervisors, operating system, application/middleware, and data for the computer program may each have a different risk/priority level), a vulnerability density (e.g., the number of vulnerabilities identified within the components), threat intelligence inputs (e.g., any Common Vulnerabilities and Exposures (CVE) that is associated, by various Threat Intelligence sources, with threat actors/advanced persistent threats, public exploit code presence, associated with supply chain compromises, association with malware, etc.), patching maturity (e.g., how often vendors for the components release patches for vulnerabilities, organizations specific patching practices levels, etc.), controlled utilization (e.g., nature of the component usage with regard to ownership), lifecycle state for the component (e.g., not approved/prohibited, research, endorsed for use, migrate to new version or different product, etc.), and support coverage for the program (e.g., no support, limited support, full support), etc. Each of the factors may be given a different weight (e.g., the stack score for a data component may be higher than that for its hardware, a product with high vulnerability density carries a different weight from a product with low vulnerability density, and a product with existing critical or severe vulnerabilities as rated by the organization may carry extra weight in the overall product risk score calculation).

In one embodiment, the weightings may be assigned manually or may be assigned using a machine learning engine, such as machine learning engine 116.

In one embodiment, product/version risk scoring computer program 114 may take ordinal data, such as vulnerability density, threat intelligence inputs, lifecycle and support status of the affected product/version, etc., and may assign relative importance rankings to the ordinal data as ratio values.

In one embodiment, the risk scores may be mapped to qualitative severity ratings (e.g., critical, severe, high, moderate, and low). For example, a risk score of 4.0 may have an associated severity rating of moderate. This mapping may be customized based on the organization's needs.

Using machine learning engine 116, product/version risk assessment computer program 112 may also identify alternate components that may lower the risk assessment.

In one embodiment, once development of the computer program is complete, the computer program may be deployed to production environment 140.

In one embodiment, product/version risk assessment computer program 112 may also assess computer programs under development in development environment 150, such as new versions of the computer program that are under development.

Once the computer program is deployed, product/version risk assessment computer program 112 may periodically re-assess the risk for the computer program and may provide alerts and recommendations as warranted.

In one embodiment, trained machine learning engine 116 may predict when a computer program may have a risk assessment that may be above a threshold set against the operating environment.

Figure 2:
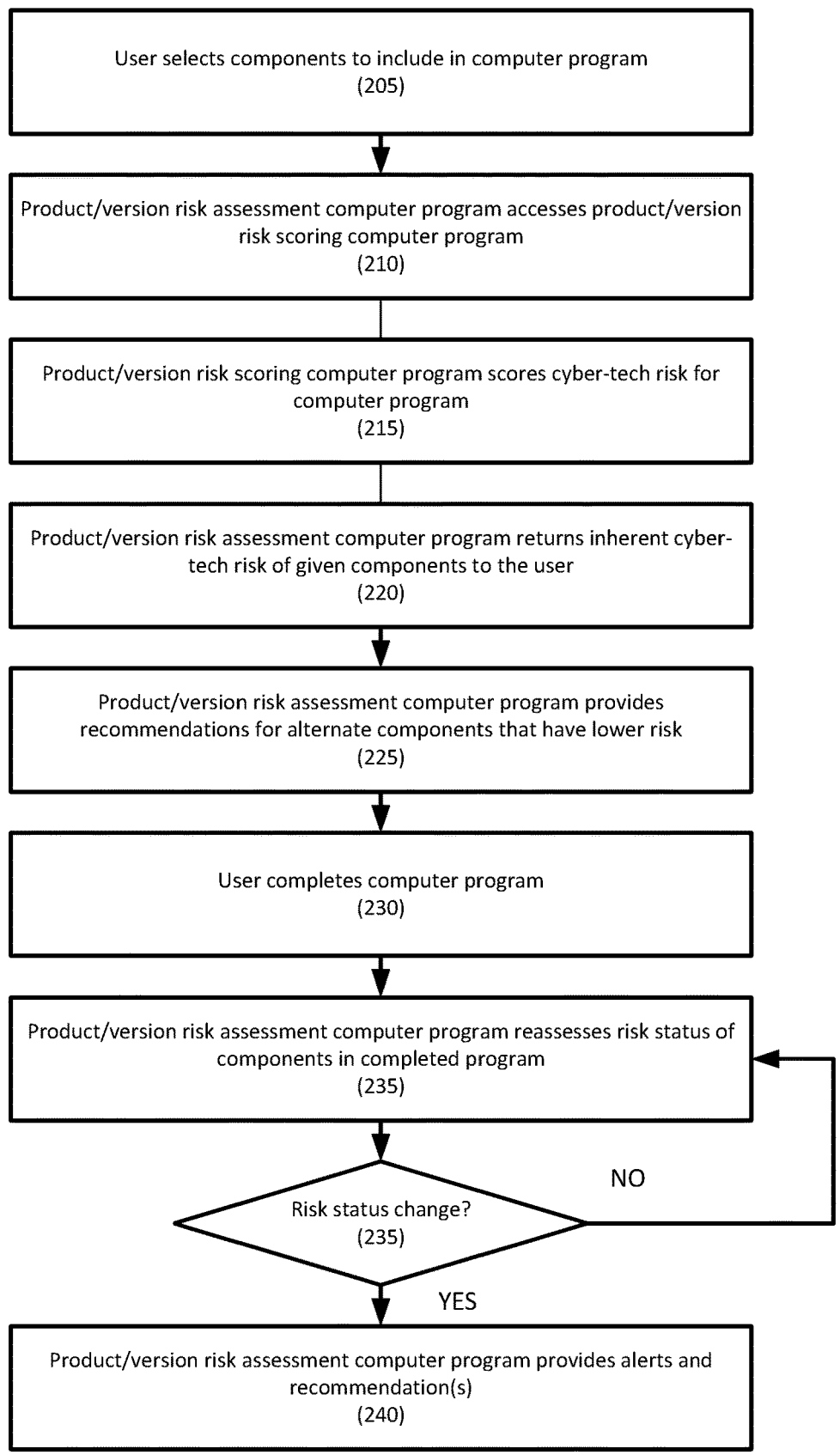
FIG. 2 depicts a method for proactively monitoring the inherent cyber-tech risk of software and hardware components according to one embodiment.

Referring to FIG. 2, a method for proactively monitoring the inherent cyber-tech risk of software and hardware components is disclosed according to an embodiment.

In step 205, a user, such as a developer, of a computer program may select components that are proposed to include in a computer program under development. The components may include commercial software components, open-source software components, internal software components, hardware, etc.

The user may identify the components in a user interface of a product/version risk assessment computer program. For example, a library of available components may be provided, and the user may identify the proposed components from the library.

In step 210, a product/version risk assessment computer program may access a product/version risk scoring computer program. In one embodiment, the product/version risk scoring computer program may receive the selection of components and may access external and/or internal threat and vulnerability tool(s)/database(s) to identify vulnerabilities in the components and cyber threats. For example, the product/version risk scoring computer program may access external product threat and vulnerability tool(s)/database(s), such as the National Vulnerability Database, Technopedia, etc., to retrieve vulnerabilities for the components. In addition, the product/version risk computer program may access internal product vulnerability databases, which may provide vulnerability information and assessments that may be specific to the organization.

In one embodiment, if there is a conflict between information in the external product vulnerability database and the internal product vulnerability database, the information in the internal product vulnerability may control.

In addition, the product/version risk scoring computer program may also identify factors associated with cyber risk to the program, such as a stack score, a vulnerability density, threat intelligence inputs, patching maturity, and controlled utilization. It may also identify factors associated with technical risk to the program, such as the lifecycle state of the program and support coverage for the program.

In step 215, the product/version risk scoring computer program may score the cyber-tech risk for the computer program. In one embodiment, the risk assessment or scoring may consider various risk elements of context and material consequences of the associated threats and vulnerabilities, etc. against the given products or versions during the risk ranking. It may take ordinal data, such as vulnerability density, threat intelligence inputs, lifecycle and support status of the affected product/version, etc., and may assign relative importance rankings as ratio values. The risk scores may be mapped to qualitative severity ratings (e.g., critical, severe, high, moderate, and low).

In one embodiment, the evaluation criteria, including vulnerabilities and other associated metrics, may be assigned different weights.

In step 220, the product/version risk assessment computer program may return the risk for the identified components. For example, the product/version risk assessment computer program may provide a qualitative severity rating or a risk score to the user. The risk assessment or risk score may be provided as high-medium-low, red-amber-green, a numeric score, etc. The risk assessment or risk score may be provided for the entire computer program, or for individual components or groups of components.

In step 225, the product/version risk assessment computer program may provide recommendations for alternate components that have less risk. For example, if a certain component is contributing to the risk assessment or risk score, the product/version risk assessment computer program may identify an alternate component for the certain component.

In one embodiment, the alternate component may be identified from an internal or external threat and vulnerability tool(s)/database(s).

In one embodiment, a trained machine learning engine may identify and provide recommendations on alternate products. For example, the trained machine learning engine may be trained on historical data to identify alternate components that have similar functionality and acceptable risk score that have been deployed to other computer programs.

The trained machine learning engine may also predict whether the alternate component can be used (e.g., no dependency issues, no interaction issues with other components, etc.).

In one embodiment, the trained machine learning engine may learn the user's behavior/search data and may recommend alternative components from the same product domain or type, which have lower risk ratings, as alternatives to the components that the user is searching for and available within the organizations inventory system.

In one embodiment, the trained machine learning engine may predict/forecast the product's risk ratings for the next N-months based on the historical risk ratings of the product and/or versions and the ongoing threat intelligence inputs from various sources, affected vendors patch release frequency/trends, etc.

In one embodiment, the trained machine learning engine may learn the user's search and subscription data, and may notify the user of any identified vulnerabilities and/or change in risk ratings within the products/versions which the user uses or has subscribed to. Embodiments may also monitor security hygiene best practices, such as notifying the stakeholders if their affected versions are behind pre-configured latest version, and may also reassess the organization's risk profiles and risk appetites values derived from the various available products regularly, based on feedback from stakeholders throughout the organization.

In step 230, the user may complete the computer program using the components or alternate components. When the computer program is complete, it may be deployed to a production environment for use.

In step 235, the product/version risk assessment computer program may reassess the components in completed program. For example, the reassessment may be performed periodically, on-demand, or as otherwise necessary and/or desired. In one embodiment, the product/version risk assessment computer program may assess the vulnerability in a manner similar to that described in steps 210, 215, and 220, above.

In step 235, if there is a new vulnerability, or the risk assessment is above a certain level, in step 240, the product/version risk assessment computer program may provide an alert to the user. The product/version risk assessment computer program may also provide recommendations on alternate components for any vulnerable components.

In one embodiment, if the risk assessment is at or above a certain level, the product/version risk assessment computer program may disable any affected computer program/components within the inventory system until the vulnerability is addressed.

Figure 3:
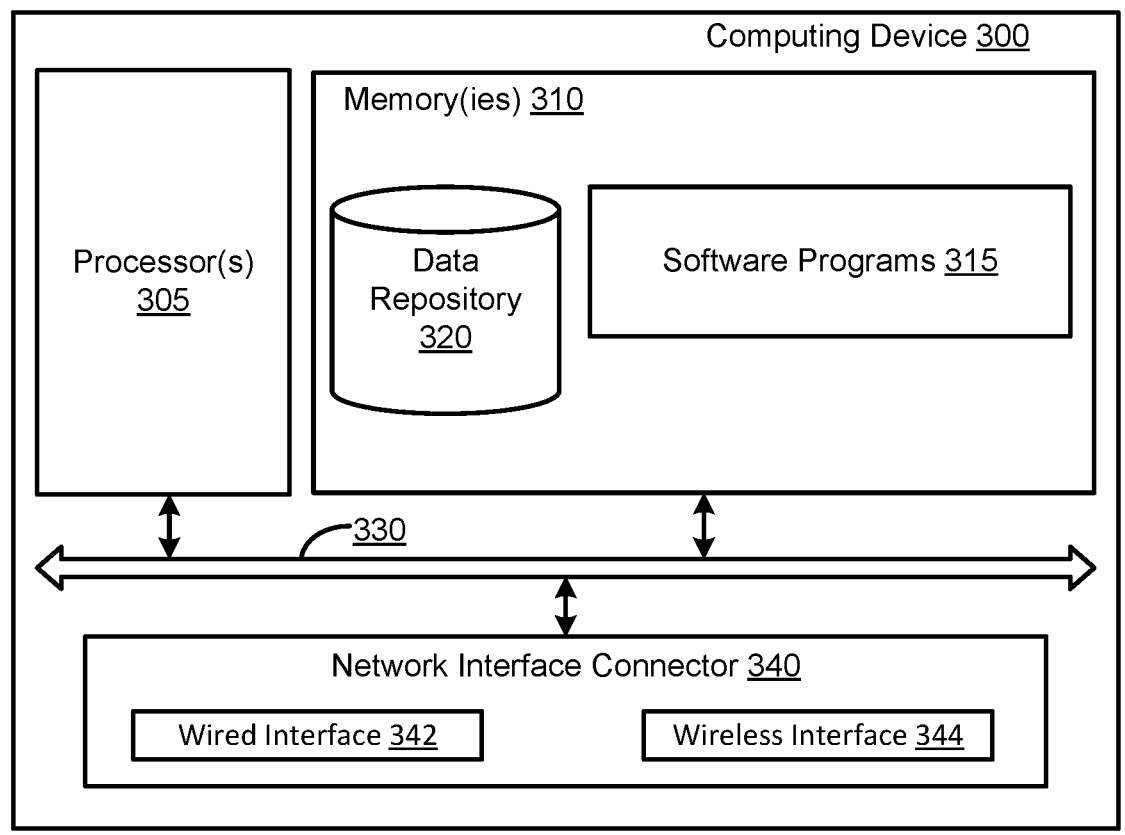
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

The disclosures of U.S. Provisional Patent Application Ser. Nos. 63/126,935 and 63/138,951, U.S. patent application Ser. No. 17/538,763, and U.S. patent application Ser. No. 17/664,579 are hereby incorporated, by reference, in their entireties.

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
receiving, by a product/version risk assessment computer program executed by an electronic device and from a user computer program executed by a user electronic device, an identification of a plurality of proposed components to include in a computer program under development;
retrieving, by the product/version risk assessment computer program, vulnerability information for each of the plurality of proposed components, wherein the vulnerability information identifies a security vulnerability for the proposed component;
generating, by a product/version risk scoring computer program, a risk score for the computer program under development based on the vulnerability information, wherein the risk score is based on a stack score for the computer program under development, a vulnerability density for each of the plurality of proposed components, threat intelligence inputs for each of the plurality of proposed components, patching maturity for each of the plurality of proposed components, a lifecycle state for each of the plurality of proposed components, and support coverage for each of the plurality of proposed components; and
returning, by the product/version risk assessment computer program, the risk score to the user computer program.

2. The method of claim 1, wherein the plurality of proposed components comprise hardware components and/or software components.

3. The method of claim 1, wherein the vulnerability information is retrieved from an external threat and vulnerability tool/database.

4. The method of claim 3, wherein the vulnerability information is further retrieved from an internal threat and vulnerability tool/database.

5. The method of claim 1, wherein the risk score comprises a dynamic qualitative severity rating.

6. The method of claim 1, further comprising:
identifying, by the product/version risk assessment computer program, an alternate component for one of the plurality of proposed components in response to the proposed component having certain cyber-tech risk related information.

7. The method of claim 6, wherein the alternate component is identified using a trained machine learning engine.

8. A system, comprising:
a user electronic device executing a user computer program;
an electronic device executing a product/version risk assessment computer program and a product/version risk scoring computer program;
an internal threat and vulnerability tool/database; and
an external threat and vulnerability tool/database;
wherein:
the user computer program receives an identification of a plurality of proposed components to include in a computer program under development;
the product/version risk assessment computer program receives the identification of a plurality of proposed components and retrieves vulnerability information for each of the plurality of proposed components from the internal threat and vulnerability tool/database and the external threat and vulnerability tool/database;
the product/version risk scoring computer program generates a risk score for the computer program under development based on the vulnerability information, wherein the risk score is based on a stack score for the computer program under development, a vulnerability density for each of the plurality of proposed components, threat intelligence inputs for each of the plurality of proposed components, patching maturity for each of the plurality of proposed components, a lifecycle state for each of the plurality of proposed components, and support coverage for each of the plurality of proposed components; and
the product/version risk assessment computer program returns the risk score to the user computer program.

9. The system of claim 8, wherein the plurality of proposed components comprise hardware components and/or software components.

10. The system of claim 8, wherein the risk score comprises a dynamic qualitative severity rating.

11. The system of claim 8, wherein the product/version risk assessment computer program identifies an alternate component for one of the plurality of proposed components in response to the proposed component having certain cyber-tech risk related information.

12. The system of claim 11, further comprising a trained machine learning engine, wherein the product/version risk assessment computer program identifies the alternate component using the trained machine learning engine.

13. A non-transitory computer readable storage medium, including instructions stored thereon, which when read and executed by one or more computer processors, cause the one or more computer processors to perform steps comprising:
receiving, from a user computer program executed by a use electronic device, an identification of a plurality of proposed components to include in a computer program under development;
retrieving vulnerability information for each of the plurality of proposed components, wherein the vulnerability information identifies a security vulnerability for the proposed component;
generating a risk score for the computer program under development based on the vulnerability information, wherein the risk score is based on a stack score for the computer program under development, a vulnerability density for each of the plurality of proposed components, threat intelligence inputs for each of the plurality of proposed components, patching maturity for each of the plurality of proposed components, a lifecycle state for each of the plurality of proposed components, and support coverage for each of the plurality of proposed components; and
returning the risk score to the user computer program.

14. The non-transitory computer readable storage medium of claim 13, wherein the plurality of proposed components comprise hardware components and/or software components.

15. The non-transitory computer readable storage medium of claim 13, wherein the vulnerability information is retrieved from an external threat and vulnerability tool/database.

16. The non-transitory computer readable storage medium of claim 15, wherein the vulnerability information is further retrieved from an internal threat and vulnerability tool/database.

17. The non-transitory computer readable storage medium of claim 13, further including instructions stored thereon, which when read and executed by one or more computer processors, cause the one or more computer processors to perform identify an alternate component for one of the plurality of proposed components in response to the proposed component having certain cyber-tech risk related information.

\* \* \* \* \*